United States Patent [19]

Sadowski

[11] 4,439,498

[45] Mar. 27, 1984

[54] CORROSION RESISTANT STAINLESS STEEL COVERED ELECTRODE

[75] Inventor: Edward P. Sadowski, Ringwood, N.J.

[73] Assignee: The International Nickel Company, Inc., New York, N.Y.

[21] Appl. No.: 935,349

[22] Filed: Aug. 21, 1978

Related U.S. Application Data

[63] Continuation-in-part of Ser. No. 717,093, Aug. 24, 1976.

[51] Int. Cl.³ .............................................. B22F 7/04
[52] U.S. Cl. .................................... 428/558; 428/560; 219/136; 219/137 WM
[58] Field of Search ...... 219/136, 145, 146, 137 WM; 428/385, 386, 558, 560; 148/24; 427/59, 61; 252/502, 503, 512, 518, 521

[56] References Cited

U.S. PATENT DOCUMENTS 3,181,970 4/1965 Peck et al. .......................... 117/205
3,547,625 12/1976 Peck et al. ............................ 75/128

OTHER PUBLICATIONS

Forbes Jones, R. M., American Foundrymen's Society Transactions, pp. 349-352, 1973.

*Primary Examiner*—Josephine Barr
*Attorney, Agent, or Firm*—Edward A. Steen; Raymond J. Kenny; Ewan C. MacQueen

[57] ABSTRACT

A covered electrode for welding chloride resistant stainless steel of the type containing about 0.04% carbon, 20% chromium, 24% nickel, 5% molybdenum, and balance iron. The covered electrode provides the capability for producing substantially defect-free stainless steel weld deposits that offer excellent resistance to crevice corrosion, as well as general corrosion in chloride containing environments.

1 Claim, No Drawings

CORROSION RESISTANT STAINLESS STEEL COVERED ELECTRODE

The present invention relates to a covered electrode especially suited for the welding of chloride-resistant stainless steels, and is a continuation-in-part of patent application U.S. Ser. No. 717,093 filed Aug. 24, 1976.

The advent of a cast version of an alloy affording exceedingly useful corrosion resistance in chloride environments and described in U.S. Pat. No. 3,547,625 has led to a need for a covered electrode suitable for the repair welding of such castings as well as for joining such castings to each other and to dissimilar alloys. The casting alloy has been described in a publication in TRANSACTIONS of the American Foundrymen's Society, pages 349–352, 1973, and nominally contains 0.04% C, 20% Cr, 24% Ni, 5% Mo, bal. Fe. Also disclosed in this publication is the composition of a filler wire suitable for the inert gas shielded-arc welding of the casting alloy.

Although a filler wire such as that described in the aforementioned publication is suitable in many instances for the weld repair of defects in castings and for joining such castings to each other and to dissimilar alloys, a need also exists for a covered electrode since many foundries only have available the simple welding equipment used with covered electrodes. In addition, covered electrodes offer operational advantages over the inert gas shielded-arc processes in that welding operations can be performed in closer quarters and with greater ease, particularly when small quantities of parts are involved.

There are many different types of stainless steel covered electrodes available in the marketplace; however, primarily due to compositional considerations, the weld deposits provided by such covered electrodes are unsuitable as regards the severe chloride corrosion resistance and crevice corrosion resistance required by the applications intended for the present cast stainless steel.

Many of the flux ingredients used in the preparation of covered electrodes are common to a variety of flux formulations. However, the flux ingredients must be appropriately proportioned, and a particular combination of ingredients must be used and selected for a specific core wire, the combination being of use for welding a specific base metal. The characteristics of a particular blend of flux ingredients must provide useful operating characteristics, sound weld deposits, and useful corrosion resistance and mechanical properties.

It has now been discovered that a covered electrode having a special flux coating extruded upon the surface of a chloride-resistant stainless steel core wire can be used to prepare sound, chloride-resistant weld deposits in stainless steel castings; the covered electrode is also suited for joining such stainless steels to dissimilar alloys.

Generally speaking, the present invention contemplates a chloride-resistant stainless steel welding electrode comprising a solid core wire containing up to about 0.1% carbon, up to about 1.0% silicon, from about 20% to about 28% nickel, from about 15% to about 25% chromium, from about 4% to about 8% molybdenum, from about 0.1% to about 5% manganese, up to about 0.5% aluminum, up to about 0.1% titanium, from about 0.005% to about 0.1% of an element selected from the group consisting of calcium and magnesium, and the balance essentially iron; and a flux coating containing, in parts by weight, from about 20 parts to about 30 parts calcium carbonate, from about 10 parts to about 22 parts of titania, from about 10 parts to about 22 parts of a compound selected from the group consisting of manganese carbonate and manganese dioxide, from about 10 parts to about 22 parts of cryolite, from about 10 parts to about 22 parts of a ferrocolumbium alloy containing about 60% by weight columbium, and from about 2 parts to about 4 parts of bentonite.

The core wire used for the covered electrode should not contain more than about 0.1% carbon, and it is preferred that this element be limited to about 0.06% since the presence of excessive quantities of this element can lead to the formation of chromium carbide, which causes deterioration of the corrosion-resisting characteristics of the weld deposit. The carbide stabilizing element columbium is added through the flux coating to minimize the deleterious effect of carbon on the corrosion resistance of weld deposits and to provide crack resistant weld deposits.

The silicon content of the core wire should not exceed about 1% since excessive quantities of this element can lead to weld deposit cracking. It is preferred that a small amount of silicon, about 0.5%, be present in the core wire since this element is useful as a deoxidant and serves to improve the hot workability characteristics of the alloy so that it may be worked to wire form.

The corrosion resistance, austenitic structure, and toughness of weld deposits is largely attributed to the presence of nickel in amounts from about 20 to about 28%. Due to the presence of chromium and molybdenum in the alloy, it is preferred that at least about 23% nickel be present in the core wire to counteract the ferrite forming tendency of chromium and molybdenum. Since nickel contents in excess of about 28% have led to the formation of weld cracks, it is most preferred that this element be present in an amount not exceeding about 27%.

Chromium contributes substantially to the corrosion resistance of the alloy and for this reason should be present in an amount of at least about 15%. Also, when chromium is present in an amount less than about 15%, weld deposits are subject to cracking. It is preferred that chromium be present in an amount above about 19% to substantially avoid corrosion and welding problems. Chromium is a well known ferrite promoter and should not be present in amounts exceeding about 25% to maintain an essentially austenitic structure. It is preferred that chromium be present in an amount of no more than about 22% since excessive quantities of ferrite can lead to the formation of the well known embrittling phase sigma, which can be responsible for weld deposit cracking.

Molybdenum contributes to the corrosion resistance of weld deposits and should be present in amounts from about 4% to about 8% for this purpose. When less than about 4% molybdenum is present, weld deposits are susceptible to crevice corrosion, as well as cracking in heavy section welds. To limit weld deposit cracking, it is preferred that molybdenum be present in an amount above about 5.5%. Since molybdenum acts as a ferrite stabilizing element in the same way as chromium, it is essential that no more than about 8% molybdenum be present in weld deposits to limit ferrite formation.

Manganese is generally added to the core wire as a deoxidant since it improves the hot workability of the ingot and aids in its breakdown to wire form. This element also serves as a deoxidizer in the weld pool. Generally, at least about 0.1% manganese, and preferably about 0.3% manganese, is added to the melt for this purpose. Manganese also aids weld deposit crack resistance; however, no more than about 5% manganese, and preferably no more than about 2% manganese, should be present since excessive quantities can cause weld deposit cracking and other difficulties during working of the alloy to wire form.

A small amount of aluminum is added to the core wire in an amount up to about 0.5%. This element aids in the deoxidation during melting, as well as during the welding process. No more than about 0.5% aluminum, and preferably no more than about 0.2% aluminum, should be contained in the melt since excessive aluminum can lead to difficulty in pouring sound ingots. Aluminum is largely consumed during covered electrode welding, and only small residual quantities of this element are found in covered electrode weld deposits.

Small additions, up to about 0.1%, of titanium are used to deoxidize the melt and are partially responsible for the useful hot and cold working characteristics of the core wire alloy. Titanium serves an additional deoxidation function by reacting with oxygen in the weld pool and removing it from the weld deposit as a slag.

It is essential to the hot working characteristics of the core wire alloy that form about 0.005 to about 0.1% of calcium, or magnesium, or both, be present in the molten alloy. Omission of either or both of these elements leads to breakup of the ingot during the hot working operation. The upper level of 0.1% each of these elements should not be exceeded since excessive quantities can cause weld deposit cracking.

Iron is the major constituent of the core wire. It should be understood that the expression, "balance essentially," used in regard to iron does not exclude the presence of other elements commonly present as incidental elements, e.g., impurities normally associated with this type of alloy in small amounts that do not adversely affect the novel characteristics of the core wire.

In the flux coating, calcium carbonate should be present in amounts from about 20 to about 30 parts by weight, and preferably from about 23 to about 27 parts. This compound serves to provide the shielding gas which protects the arc and weld deposit from contamination by the atmosphere. Insufficient quantities of calcium carbonate will lead to inefficient shielding of the arc and weld deposit. This is of particular concern where manganese dioxide is used rather than manganese carbonate in the preparation of this flux since decomposition of manganese carbonate provides an additional source of carbon dioxide shielding gas.

Calcium carbonate also serves the additional role of slag former. Insufficient quantities of this ingredient cause incomplete slag coverage with consequent oxidation of the weld surface. Excessive quantities of calcium carbonate lead to difficulty in slag removal due to the non-friable characteristic of such a slag.

Titania is another principal slag former used in the preparation of the electrode. Titania should be present in an amount from about 10 to about 22 parts, and preferably from about 16 to about 20 parts. When less than about 10 parts titania, or preferably 16 parts, is present in the coating, the center portion of the weld bead becomes exposed to the atmosphere with consequent oxidation. An excessive quantity of this ingredient causes difficulty in slag removal. Titania also serves as an arc stabilizer. When present in an amount less than about 10 parts, and preferably 16 parts, or more than about 22 parts, and preferably 20 parts, arc instability and short circuiting characteristics are encountered.

Manganese carbonate ($MnCO_3$) or manganese dioxide ($MnO_2$) and mixtures of manganese carbonate and manganese dioxide in amounts from about 10 to about 22 parts, and preferably from about 14 to about 20 parts, are contained within the flux coating. Manganese carbonate provides an additional source of carbon dioxide shielding gas which forms during the welding process. The formation of carbon dioxide is not, however, the basic function of manganese carbonate. Because sufficient shielding gas is generally supplied by breakdown of the calcium carbonate, manganese dioxide may be used in place of manganese carbonate and, in fact, is preferred for this purpose primarily due to a difficult supply situation for manganese carbonate.

Other manganese oxides such as manganese monoxide ($MnO$) and manganous-manganic oxide ($Mn_3O_4$) cannot be used in place of the aforementioned manganese compounds since their use results in deterioration of operating characteristics, as well as sticking of the slag upon the surface of the weld bead.

The useful manganese compounds, manganese carbonate and manganese dioxide, provide additional manganese to the weld deposit due to reduction during the welding operation. Manganese from the flux ingredients and from the core wire serves to improve the cracking resistance of the weld deposit. (The weld deposit should contain no more than 5%, preferably 2%, manganese.) The flux coating should contain at least about 10 parts manganese carbonate, or manganese dioxide, or both, and preferably no less than about 14 parts of these compounds. With less than about 10 parts manganese dioxide, e.g., 8 parts $MnO_2$, arc instability and excessive slag fluidity lead to poor bead appearance. No more than about 22 parts manganese carbonate, or manganese dioxide, or both, and preferably no more than about 20 parts of these compounds should be present in the flux coating since excessive quantities of manganese substantially lower the ductility of weld deposits and can cause weld deposit cracking.

Although the aforementioned ingredients are considered to act as fluxing or cleansing ingredients to some extent, the principal addition for this specific function is fulfilled by the presence of cryolite ($Na_3AlF_6$) in an amount from about 10 to about 22 parts, and preferably from about 16 to about 20 parts. Other fluoride compounds, such as calcium fluoride, should not be substituted all or in part for cryolite in this flux formulation since such substitution can cause deterioration of the operational and slag removal characteristics of the covered electrode. When less or more than the broad amounts of cryolite are present in the flux coating, operational problems are encountered in that the melting point of the flux coating is increased resulting in extinguishment of the arc due to interference between the still solid, excessively high melting temperature coating and the work piece.

Columbium additions are made to the flux coating through the use of a ferro-60% columbium master alloy. This ingredient is added to the flux coating in an amount from about 10 to about 22 parts, and preferably from about 16 to about 20 parts. It is preferred that the ferrocolumbium alloy contain no less than about 50 and no more than about 70 percent by weight columbium, so that this ingredient will provide melting characteristics compatible with the other flux ingredients. Ferrocolumbium provides an additional source of a deoxidizing ingredient for the weld pool. The columbium in the weld deposit also serves to tie up carbon, thus freeing chromium for its corrosion protecting function. When less than or more than the broad amounts of this ingredient are present, weld deposits are subject to weld cracking. It might be added that if columbium is present in the filler metal and not in the flux, excessive weld cracking is likely. This has been experienced, as will be shown infra, in connection gas-tungsten arc welding with an otherwise matching composition.

Bentonite, a colloidal clay, is added to the flux coating as an extrusion aid. Between about 2 and about 4 parts, e.g., 3 parts, should be contained within the flux coating. It is contemplated that other well known extrusion aids such as mica can be substituted completely or in part for bentonite.

Generally, powdered ingredients having a particle size between about 60 microns and about 300 microns are used to prepare flux coatings for covered electrodes. The dry ingredients are blended and then mixed with a water dispersible binder such as sodium silicate or potassium silicate. The amount of binder suitable for the preparation of electrodes of this invention is about 15% of a 70° Baumé solution. The flux is blended with the silicate solution and water as needed to provide an extrudible consistency. Although the flux coating can be applied to the core wire by any desirable means, extrusion has been found to be the preferred means for preparing covered electrodes of this invention. In the preparation of extruded coatings, it has been found that a 3.3 mm diameter coating should be used on a 2.38 mm diameter core wire, a 4.8 mm coating on a 3.2 mm diameter core wire, a 5.6 mm diameter coating on a 4 mm diameter core wire, and a 6.6 mm diameter coating on a 4.8 mm diameter core wire. Following extrusion, it has been found that the electrodes should be baked at a temperature of from about 260° to about 425° C., e.g., 370° C., for a period of about 2 hours to bind the flux coating to the core wire and drive off excess moisture. Covered electrodes prepared in the aforedescribed manner are resistant to relatively rough handling and are suitable for use in the preparation of weld deposits.

For the purpose of giving those skilled in the art a better understanding of the invention, the following illustrative examples are given:

EXAMPLE I

Core wire from a commercial heat of a 1.4% manganese-containing stainless steel having the composition shown in Table I for Core Wire No. 1 was used to prepare a 225 kilogram batch of covered electrodes. The core wire was 3.2 mm diameter and was coated by extrusion to 4.8 mm diameter, with the coating having the preferred composition as shown in Table II for Flux No. 1. This flux contained 18 parts manganese dioxide ($MnO_2$) as the manganese-containing compound. A sodium silicate solution having 70° Baumé viscosity was used as the binder. The electrodes were baked for about two hours at 370° C. following extrusion.

The operating characteristics of the covered electrode were determined by running beads on the surface of a stainless steel plate at 90 amperes Direct Current Reverse Polarity. The arc stability, burn-off, slag coverage and removal, weld and slag fluidity, and transfer characteristics were all rated of good quality. The slag could be removed from the weld deposit with ease, and the weld deposit had a desirable contour.

Based on the useful operational characteristics and freedom from weld deposit cracking during the bead-on-plate evaluation, a weld was made in a stainless steel casting repair test specimen having the composition shown for Base Plate No. 1 in Table III. The crack sensitivity casting repair test specimen was prepared from an as-cast 2.54 cm thick × 7.6 cm wide × 15.2 cm long plate. The surface of the plate was machined to remove the surface layer, and 1.1 cm radius groove, 2.2 cm wide was machined on this face along the center line for a distance of about 10 cm centered on one of the 7.6 cm × 15.2 cm faces. This groove simulates the groove that could result after the machining away of a casting defect.

TABLE I

COMPOSITIONS OF CORE WIRES

| Core Wire No. | COMPOSITION IN WEIGHT PERCENT, BALANCE Fe | | | | | | | | |
|---|---|---|---|---|---|---|---|---|---|
| | C | Mn | Si | Ni | Cr | Mo | Al | Ti | Other |
| 1 | 0.027 | 1.42 | 0.56 | 24.2 | 20.3 | 6.4 | 0.04 | | |
| 2 | 0.046 | 0.26 | 0.30 | 25.7 | 20.9 | 7.0 | 0.006 | <0.01 | 0.05 Ca added |
| 3 | 0.034 | 0.35 | 0.82 | 24.0 | 20.4 | 5.3 | 0.017 | 0.09 | 0.05 Ca added |
| 4 | 0.059 | 0.05 | 0.10 | 26.1 | 21.7 | 6.7 | 0.15 | 0.07 | 0.008 Mg |

TABLE II

COMPOSITIONS OF COVERED ELECTRODE FLUX COATINGS

| Flux No. | Core Wire No. | Weld No. | COMPOSITION IN PARTS BY WEIGHT | | | | | | |
|---|---|---|---|---|---|---|---|---|---|
| | | | $CaCO_3$ | $TiO_2$ | $MnCO_3$ | $MnO_2$ | $Na_3AlF_6$ | Fe-60% Cb | Bentonite |
| 1 | 1 | 1,5,6 | 25 | 18 | 0 | 18 | 18 | 18 | 3 |
| 2 | 2 | 2 | 25 | 18 | 18 | 0 | 18 | 18 | 3 |
| 3 | 1 | 3,4 | 25 | 18 | 18 | 0 | 18 | 18 | 3 |
| 4 | 3 | 7 | 25 | 18 | 18 | 0 | 18 | 18 | 3 |
| 5 | 4 | 8 | 30 | 23 | 22 | 0 | 22 | 0 | 3 |

The groove in the crack sensitivity casting repair test specimen was filled with weld metal in the flat position using the aforedescribed electrodes at 90 amperes DCRP. Thirteen passes were required to fill the groove. The temperature of the block and weld deposit was maintained below 100° C. between passes. Slag was easily removed by chipping after each pass. The surface of the weld bead was cleaned by power wire brushing using a stainless steel wire brush.

The completed weld (Weld No. 1 in Table IV) was radiographically examined and found to be free from weld cracking and other defects. This weld crack sensitivity casting repair test specimen was cut into 8 transverse slices. The surface of the 9.5 mm thick slices were ground on an abrasive wheel and polished on a rubber bonded abrasive wheel. The polished specimens were etched with Lepito's reagent to reveal the macrostructure of the weld and any cracks or other defects present within the weld deposit and base metal.

Examination of the weld slices at 10 magnifications showed complete freedom from weld cracking and other defects (Weld No. 1 in Table IV). Duplicate slices from this weld were heat treated for three hours at 1120° C. and water quenched. These slices were machined to 3.2 mm thick and bent 180° about a 3.2 cm diameter pin. Examination at 10 magnifications showed complete freedom from weld and heat affected zone cracking. The composition of Weld No. 1 is shown in Table V.

EXAMPLE II

Flux No. 2, similar in all respects to the flux described in Example I, except that it contained 18 parts manganese carbonate ($MnCO_3$) in place of manganese dioxide ($MnO_2$) as shown in Table II was extruded on core wire having the composition shown for core wire no. 2 in Table I and used to prepare a crack sensitivity casting repair test specimen similar to that described in Example I. The operability of this electrode was found to be of good quality and equivalent to that exhibited by the manganese dioxide containing covered electrode. The simulated repair weld in Plate No. 2 (Table III) was completed in seven passes using 90 amperes DCRP, and an inter-bead temperature below 100° C. was maintained. The composition of weld deposit no. 2 is shown in Table V.

TABLE III

| | | | COMPOSITIONS OF TEST PLATES | | | | | | | |
|---|---|---|---|---|---|---|---|---|---|---|
| Plate No. | Weld No. | Flux No. | COMPOSITION IN WEIGHT PERCENT, BALANCE FE | | | | | | | |
| | | | C | Mn | Si | Ni | Cr | Mo | Al | Ti | Other |
| 1 | 1 | 1 | 0.012 | 0.56 | 0.74 | 24.5 | 21.5 | 4.9 | 0.011 | <0.01 | 0.004 Ca |
| 2 | 2 | 2 | 0.017 | 0.27 | 0.65 | 24.4 | 20.4 | 5.1 | 0.008 | 0.024 | 0.047 Ca |
| 3 | 3,4 | 3 | 0.044 | 0.32 | 0.79 | 24.1 | 20.4 | 5.1 | 0.027 | 0.024 | 0.006 Ca |
| 4* | 5 | 1 | 0.03 | 0.3 | 0.2 | 40. | 21. | 3. | 0.1 | 1. | 2 Cu |
| 5 | 6 | 1 | 0.05 | 0.20 | 0.19 | 76.6 | 15.5 | | | | |
| 6 | 7 | 4 | 0.011 | 0.34 | 0.62 | 25.7 | 20.2 | 5.3 | 0.017 | 0.011 | 0.012 Ca |
| 7 | 8 | 5 | 0.012 | 0.25 | 0.56 | 24.1 | 20.0 | 5.4 | 0.002 | 0.010 | 0.007 Ca |

*Nominal Composition.

Radiographic inspection of the completed crack sensitivity casting repair test specimen revealed freedom from cracking and other objectionable defects (weld no. 2 in Table IV). Polished and etched transverse slices cut from the completed welds showed complete freedom from cracking and other defects when examined at 10 magnifications. Bend tests on 3.2 mm thick transverse slices in the as-welded condition as well as on slices that had been post weld heat treated for three hours at 1175° C. and water quenched also showed freedom from cracking and other defects. These severe examination procedures showed the excellent soundness characteristics of weld deposits prepared with the flux coating/core wire combination of this invention.

The corrosion resistance of the welded member was examined in a ferric chloride solution which was prepared by dissolving 180 grams of $FeCl_3.6H_2O$ in one liter of water. The 3.2 mm×2.54 cm×5 cm test specimens were immersed in the ferric chloride solution for 72 hours at room temperature and examined for general corrosion as well as crevice corrosion. A crevice was provided by a rubber band placed about the specimen in the direction of the 5 cm dimension.

No evidence of crevice corrosion was found, and the corrosion resistance of the welded samples was equivalent to that of the casting alloy.

TABLE IV

| | SOUNDNESS OF WELD DEPOSITS | | | | |
|---|---|---|---|---|---|
| | | | | Cracks/Section | |
| Weld No. | Weld Type | Flux No. | Radiograph | Transverse Slices | Bend Test |
| 1 | Repair | 1 | 0 | 0 | 0[(1)] |
| 2 | Repair | 2 | 0 | 0 | 0[(2)] |
| 3 | 1.6 cm Butt | 3 | 0 | — | — |
| 4 | 1.6 cm Butt | 3 | 0 | — | — |
| 5 | 1.3 cm Butt | 1 | 0 | — | — |
| 6 | 1.3 cm Butt | 1 | — | 0 | 0 |
| 7 | Repair | 4 | 0 | 0 | 14[(3)] |
| 8 | Repair | 5 | 0 | 1 | 2[(3)] |

[(1)]Tested after 3 hours/1120° C./Water Quench heat treatment.
[(2)]Tested in the "as-welded" condition as well as after 3 hours/1175° C./Water Quench heat treatment.
[(3)]Tested after 3 hours/1175° C./Water Quench heat treatment.

EXAMPLE III

A covered electrode having an 18 parts maganese carbonate flux (No. 3 in Table II) was extruded on core wire no. 1 (Table I) and used to prepare two 1.6 cm thick×15.2 cm wide×25.4 cm long panels having the compositions shown for Plate No. 3 in Table III. One of the 25.4 cm edges of each of the plates used to prepare the panels was beveled at a 60° angle. A 2.4 mm wide root face was ground on the beveled surface. The plates were placed 3.2 mm apart and restrained to a 10.2 cm thick copper-faced steel platen with U-strap clamps. Butt welds were completed in ten passes using 90 amperes DCRP and an inter-bead temperature below 100° C. was maintained.

The operating characterisitcs of the welding electrode were considered to be good for all passes in the welded joints. The joints were radiographically inspected and found to be free from defects (weld nos. 3 and 4 in Table IV). No destructive tests were performed on the welds.

One of the panels was machined to 6.4 mm×7.3 cm×25.4 cm, ground on all surfaces to a 180 grit finish and a 1.3 cm dia. hole drilled at the center. Serrated plastic nuts of 2.54 cm dia. were torqued in place on both sides of the panel to provide multiple, tight crevices in the weld area. The panel was immersed in a sea water trough at a test site in Harbor Island, N.C. Sea water was passed over the surface of the welded panel at 61 cm/sec velocity for 3 months. There was essentially no weight loss (less than 0.1 gram), no measurable crevice corrosion or pitting and no signficant attack of the base metal or preferential attack of the weld area.

The second panel was machined to 6.4 mm×7.3 cm×25.4 cm, ground on all surfaces to a 180 grit finish and exposed for one year to sea water flowing at 61 cm/sec in the sea water trough. There was no preferential attack of the weld area, essentially no weight loss (less than 0.1 gram), and the maximum depth of measurable attack was less than 0.025 mm.

These tests illustrate the excellent sea water corrosion resistance of weld deposits prepared with the covered electrode of the present invention.

TABLE V
COMPOSITION OF WELD DEPOSITS

| Weld No. | Flux No. | COMPOSITION IN WEIGHT PERCENT, BALANCE FE | | | | | | |
|---|---|---|---|---|---|---|---|---|
| | | C | Mn | Si | Ni | Cr | Mo | Cb |
| 1 | 1 | 0.038 | 3.1 | 0.28 | 23.4 | 18.6 | 6.5 | 2.06 |
| 2 | 2 | 0.061 | 1.3 | 0.25 | 25.3 | 18.5 | 7.0 | 2.15 |
| 3,4 | 3 | 0.061 | 1.08 | 0.29 | 25.3 | 17.3 | 6.7 | 2.15 |
| 5 | 1 | 0.040 | 2.36 | 0.30 | 23.4 | 17.9 | 6.7 | 1.98 |
| 6 | 1 | 0.037 | 2.7 | 0.35 | 26.2 | 17.8 | 5.3 | 1.95 |
| 7 | 4 | 0.055 | 1.5 | 0.50 | 22.7 | 18.2 | 4.8 | 3.20 |
| 8 | 5 | 0.059 | 1.0 | 0.07 | 27.5 | 18.4 | 7.2 | nil |

EXAMPLE IV

Covered electrodes having the flux composition (flux no. 1 in Table II) and core wire (core wire no. 1 in Table I) described in Example I were used to prepare a butt weld, No. 5 shown in Table IV, between plates made of a corrosion-resistant alloy containing 40% Ni, 21%Cr, 3%Mo, 2%Cu, 1%Ti, balance iron (plate no. 4 in Table III). The 40° V beveled 1.3 cm thick×7.6 cm wide×20.3 cm long plates were set apart 4.8 mm upon a 3.2 mm thick×2.5 cm wide backing strap. The plates were restrained by clamping to a 10 cm thick copper-faced steel platen. The joint was welded in 12 passes using 90 amperes DCRP and an interbead temperature below 100° C. was maintained. The completed joint was radiographically examined and found to be free from cracking and other defects (Table IV). The composition of weld no. 5 is shown in Table V. This joint illustrated the capability of the covered electrode of this invention for welding alloys of dissimilar composition.

In addition, an all-weld-metal tensile specimen was prepared from the 1.3 cm thick joint. Tensile tests showed 462 N/mm$^2$ for the 0.2% offset yield strength, 676 N/mm$^2$ ultimate tensile strength, 23% elongation in a 2.54 cm gage length, and 27% reduction of area. These all-weld-metal tensile properties are compatible with the properties of the base alloy which after heat treatment for one hour at 1175° C. and air cooling typically exhibits 188 N/mm$^2$ yield strength, 449 N/mm$^2$ ultimate tensile strength, 48% elongation and 49% reduction of area.

EXAMPLE V

Covered electrodes having the same 4.8 mm diameter flux coating (Flux no. 1 in Table II) and 3.2 mm diameter core wire (no. 1 in Table I) as described in Example I were used to prepare a dissimilar joint between the cast plate of the composition shown for Alloy No. 1 in Table III and a plate from a wrought, commercial alloy containing 16% chromium, 7% iron, balance nickel (No. 5 in Table III). The 1.3 cm thick by 6.4 cm wide×15.2 cm long plates were prepared by beveling one 15.2 cm edge of each. The plates used to prepare the 80° V butt joint were spaced 2.4 mm apart and had a 2.4 mm root face. Eleven passes using 100 amperes DCRP were required to complete Weld No. 6, and an interpass temperature below 100° C. was maintained.

The soundness of the Weld No. 6 was determined by sectioning into eight transverse slices. The 16 cut faces were ground, polished, etched, and examined at 10 magnifications. No evidence of cracking or other weld defects were found as shown for Weld No. 6 in Table IV. Bend slices were heat treated for three hours at 1175° C. followed by water quenching and bent 180° about a 3.2 cm diameter pin. The 3.2 mm thick bend slices were also free from cracking and other objectionable defects. The composition of the disimilar weld deposit no. 6 is shown in Table V. These tests demonstrated the capability of the covered electrode for welding dissimilar metals such as nickel-base alloys to the cast stainless steel base alloy for the construction of highly corrosion resistant devices.

EXAMPLE VI

Flux No. 4, shown in Table II and representative of the preferred flux composition containing 18 parts of manganese carbonate, was extruded on 3.2 mm diameter core wire (No. 3 in Table I). The core wire contained only 5.3% molybdenum, and although within the broad composition range for the core wire of 4 to 8% molybdenum, was outside the preferred range of 5.5 to 7% molybdenum.

A crack sensitivity casting repair test specimen was prepared in the manner described in Example I and 2.54 cm thick plate of the composition shown for Plate No. 6 in Table III. Weld No. 7 was completed in 17 passes with the 3.2 mm covered electrodes using 90 amperes DCRP. The inter-pass temperature was maintained below 100° C.

Radiographic examination showed that Weld No. 7 was free from cracking and other defects (Table IV). Transverse slices were cut from the crack sensitivity casting repair test specimen, polished, etched, and examined at 10 magnifications. All of the transverse slices from Weld No. 7 were found to be free from cracking and other objectionable defects.

Bend test specimens were prepared from the transverse slices from Weld No. 7. These were heat treated for three hours at 2150° F. and water quenched prior to bending. The 3.2 mm wide test specimens were bent 180° about a 3.2 cm diameter pin. Examination of the bend test specimens at 10 magnifications revealed the presence of 14 cracks per section. The cracks were about 0.8 mm long, and this test response was considered unacceptable. The composition of Weld No. 7 is shown in Table V.

This example shows that although covered electrodes having core wires conforming to the broad composition specified for molybdenum are useful for preparing welds, such welds are not totally acceptable since they are subject to cracking in the bend test. In order to provide acceptable response in the bend test, it is necessary to provide a core wire that contains sufficient molybdenum so that the weld deposit will conform to the requirements of the preferred range for molybdenum (i.e. more than 5.5% Mo). Completely acceptable weld deposits can be prepared with covered electrodes that provide weld deposits conforming to the preferred composition, particularly in regard to molybdenum.

EXAMPLE VII

A columbium-free flux, No. 5 in Table II, was extruded upon the surface of a core wire of the preferred composition, No. 4 in Table I. The 3.2 mm diameter electrodes were used at 90 amperes DCRP to complete a 2.54 cm thick repair weld in plate of the composition shown as Plate No. 7 in Table III. A total of 12 passes were required to fill the crack sensitivity casting repair test specimen which was prepared in the manner described in Example I. The inter-pass temperature was maintained below 100° C.

Due to the absence of columbium, the operating characteristics of the covered electrode deteriorated in that there was excessive interference of the molten slag with the covered electrode, and the weld pool tended to close-up, thereby extinguishing the arc. As a result, the bead appearance upon removal of the slag, albeit with some difficulty, was not entirely satisfactory and required abrasive grinding between weld passes.

Radiographic examination did not reveal the presence of any weld defects (weld No. 8 in Table IV), however, examination of polished and etched transverse slices revealed the presence of one crack per section which was considered unacceptable. Bend tests of post weld heat-treated specimens showed an average of two cracks per section. The composition of Weld No. 8 is shown in Table V.

The cracking observed in the transverse slices and bend test sections demonstrates the need for the addition of columbium to weld deposits prepared with the covered electrode of this invention. It is clear from the foregoing that without the addition of columbium, operating characteristics of the electrode are unsatisfactory and weld deposits in the base alloy will be subject to unacceptable levels of weld cracking.

That columbium should be contained in the flux is further demonstrated by an attempt to use a matching type filler metal (core wire) in the absence of a flux, the filler containing columbium. In this connection, the core wire had the following chemistries:

| Core Wire | C | Mn | Si | Ni | Cr | Al | Ti | Cb | Ca |
|---|---|---|---|---|---|---|---|---|---|
| A | .01 | .44 | .48 | 25.9 | 19.0 | .02–.05 | .01–.03 | .45 | .001–.004 |
| B | .08 | .43 | .47 | 25.7 | 18.8 | .02–.05 | .01–.03 | .47 | .001–.004 |

Balance: iron plus impurities

The weld test comprised gas-tungsten arc repair welding of an otherwise matching cast alloy composition. Upon evaluation (examination of ten (10) faces) 58 and 71 cracks were found in the weldments, respectively. Cracking extended into the Heat Affected Zone, 4 and 3 cracks being found.

While the molybdenum content was slightly higher than contemplated herein (8.2 vs. 8%), this would not account for the excessive cracking.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A stainless steel welding electrode exhibiting corrosion resistant characteristics in chloride containing environments, the electrode comprising a core wire and a flux coating, the core wire including up to about 0.06% carbon, about 0.5% silicon, from about 23% to about 27% nickel, from about 19% to about 22% chromium, from about 5.5% to about 8% molybdenum, from about 0.2% to about 2% manganese, up to about 0.2% aluminum, up to about 0.1% titanium, from about 0.005% to about 0.1% of an element selected from the group consisting of calcium and magnesium, and the balance essentially iron; and the flux coating containing, in parts by weight, about 23 parts to about 27 parts calcium carbonate, from about 16 parts to about 20 parts of titania, from about 14 parts to about 20 parts of a compound selected from the group consisting of manganese dioxide and manganese carbonate, from about 16 parts to about 20 parts of cryolite, from about 16 parts to about 20 parts of columbium, and from about 2 parts to about 4 parts of a material selected from the group consisting of bentonite and mica.

* * * * *